United States Patent [19]

Koontz et al.

[11] 4,157,474
[45] Jun. 5, 1979

[54] X-RAY FILM CASSETTE

[75] Inventors: Paul G. Koontz, Granada Hills; Arthur M. Cantu, Thousand Oaks; Richard L. Wright, Canoga Park, all of Calif.

[73] Assignee: Hipoint Research, Inc., Van Nuys, Calif.

[21] Appl. No.: 820,599

[22] Filed: Aug. 1, 1977

Related U.S. Application Data

[63] Continuation-in-part of Ser. No. 797,442, May 16, 1977, abandoned.

[51] Int. Cl.² ............................................. G03D 13/08
[52] U.S. Cl. ....................................... 250/480; 250/481
[58] Field of Search ................ 250/475, 480, 481, 482

[56] References Cited

U.S. PATENT DOCUMENTS

| 3,703,272 | 11/1972 | Lareau | 250/480 |
|---|---|---|---|
| 3,897,345 | 7/1975 | Foster | 250/439 R |
| 3,947,686 | 3/1976 | Cooper | 250/439 R |
| 3,958,125 | 5/1976 | Zechmair | 250/480 |
| 4,032,790 | 6/1977 | Nakamura | 250/480 |

Primary Examiner—Craig E. Church
Attorney, Agent, or Firm—Laney, Dougherty, Hessin & Beavers

[57] ABSTRACT

An improved x-ray film cassette including a film support plate and a resilient concave-convex window member formed of a highly x-ray transparent material. The convex side of the window member is positioned facing the film supporting plate so that when the cassette is loaded with film, the window member is deformed into a substantially flat shape and the film is clamped over its entire surface area between the window member and the support plate.

10 Claims, 3 Drawing Figures

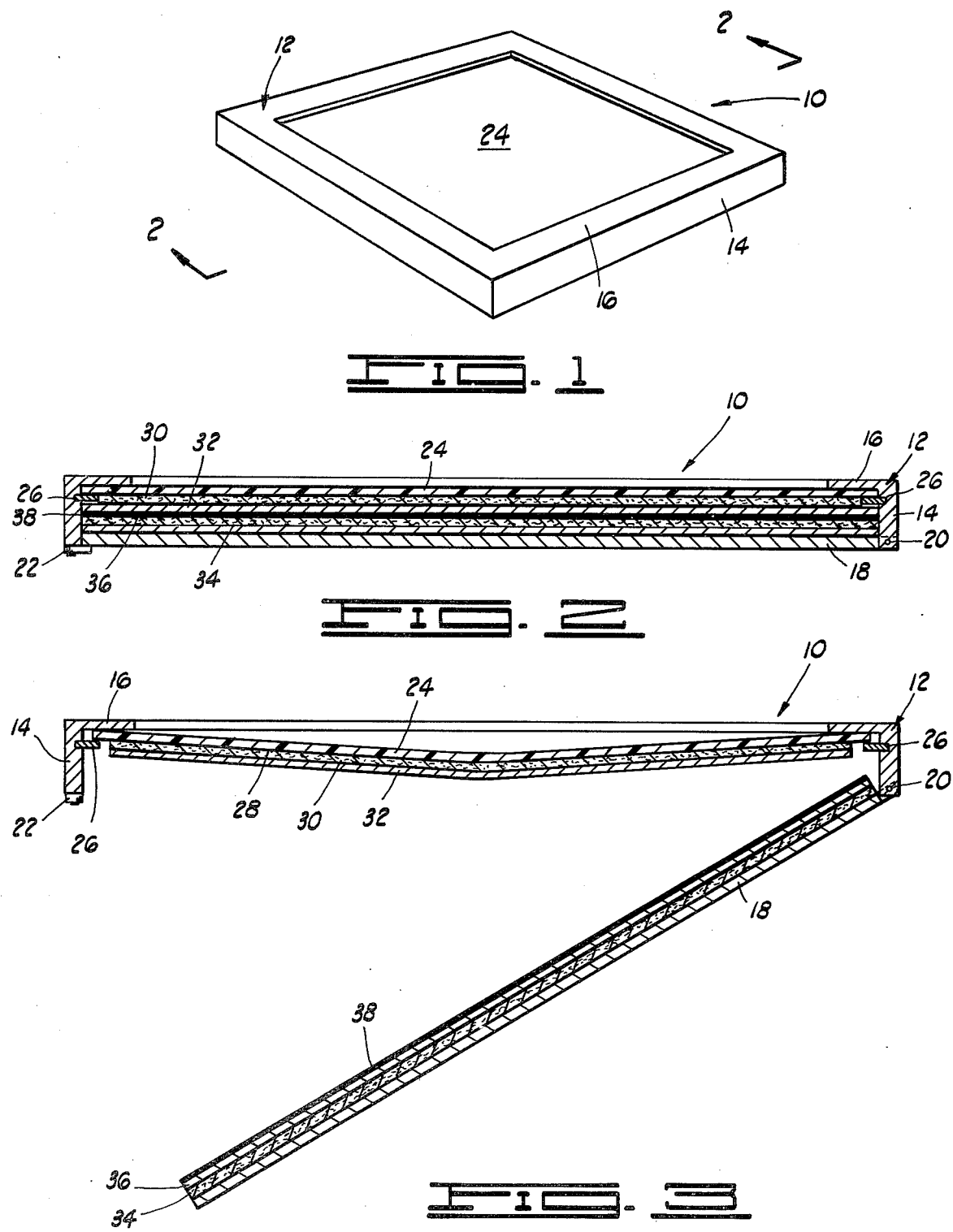

4,157,474

X-RAY FILM CASSETTE

CROSS-REFERENCES TO RELATED APPLICATIONS

This is a continuation-in-part of application Ser. No. 797,442 filed May 16, 1977 which has been abandoned.

BACKGROUND OF THE INVENTION

1. Field of the Invention

The present invention relates generally to x-ray film cassettes, and more particularly, but not by way of limitation, to x-ray film cassettes commonly utilized in radiology.

2. Description of the Prior Art

In the practice of radiology, i.e., the photographing of organs, bones, etc. using x-rays, the x-ray film is commonly placed in a cassette which is positioned to receive x-rays after they have passed through a patient's body. Such cassettes generally include a flat x-ray window and a flat film support plate between which x-ray activated luminescent screens and the x-ray film are clamped. The window members of such x-ray film cassettes have heretofore been formed of aluminum, magnesium or plastic materials which are relatively x-ray opaque requiring relatively high patient x-ray exposure. In addition, because the window members and support plates of such cassettes are flat, when they are loaded with x-ray film air is often trapped between the luminescent screens and film causing distortion of the x-ray image produced on the film.

By the present invention, an improved x-ray film cassette is provided which includes a window member of substantially increased x-ray transparency whereby patient x-ray exposure is reduced and which obviates the problems associated with air entrapment mentioned above.

SUMMARY OF THE INVENTION

An improved x-ray film cassette comprised of a frame having a resilient concave-convex window member attached to the top thereof and a film support plate hingedly attached to the bottom thereof whereby the support plate can be selectively moved between opened and closed positions. The support plate is spaced from the window member a distance such that when the support plate is in the closed position with x-ray film supported thereon, the window member is deformed into a substantially flat configuration and the x-ray film is clamped under pressure over its entire surface area between the window member and the support plate. Means for locking the support plate in the closed position are attached to the frame and/or the support plate.

It is, therefore, a general object of the present invention to provide an improved x-ray film cassette.

A further object of the present invention is the provision of an x-ray film cassette which includes a window member of substantially increased x-ray transparency as compared to heretofore used window members thereby substantially reducing required patient x-ray exposure.

Yet a further object of the present invention is the provision of an improved x-ray film cassette which when loaded with film and one or more x-ray activated luminescent screens exerts pressure on the film and screens thereby preventing air entrapment therebetween.

Other and further objects, features and advantages of the present invention will be readily apparent to those skilled in the art upon a reading of the description of preferred embodiments which follows when taken in conjunction with the accompanying drawings.

BRIEF DESCRIPTION OF THE DRAWINGS

FIG. 1 is a perspective view of the improved x-ray film cassette of the present invention.

FIG. 2 is a cross-sectional view taken along line 2—2 of FIG. 1.

FIG. 3 is a cross-sectional view similar to FIG. 2 but showing the cassette in the open position.

DESCRIPTION OF PREFERRED EMBODIMENTS

Referring now to the drawings, the improved x-ray film cassette of the present invention is illustrated and generally designated by the numeral 10. The cassette 10 is comprised of an open rectangular frame 12 formed of elements having inverted L-shaped in cross section whereby vertical sides 14 and a continuous inwardly extending top flange portion 16 are provided.

A flat rectangular film support plate 18 for closing the open bottom of the frame 12 is hingedly attached thereto by one or more pins 20 or other suitable hinge means so that the film support plate 18 can be moved between the closed position illustrated in FIG. 2 and the open position illustrated in FIG. 3. The frame 12 and plate 18 can be formed from any suitable strong durable material such as aluminum, stainless steel or plastic materials, and suitable means for locking the film support plate 18 in a closed position are provided attached to the frame 12 and/or the support plate 18. For example, one or more wing members 22 can be rotatably attached to the bottom of the side 14 of the frame 12 opposite the hinge means 20 which upon rotation provide outwardly extending shoulders for maintaining the film support plate 18 in the closed position.

An x-ray window member 24 is movably retained within the interior of the frame 12 beneath the inwardly extending flange portion 16 thereof by means of a plurality of inserts or other suitable means 26 attached to the sides 14 of the frame 12. The window member 24 is concave-convex in shape and is formed of a resilient highly x-ray transparent material which will be described further hereinbelow. As best shown in FIG. 3, the window member 24 is positioned within the frame 12 so that the convex side 28 of the window member 24 faces the film support plate 18.

Attached to the side 28 of the window member 24 is a uniform layer of a compressible material 30, e.g., felt, and attached to the compressible material 30 is a conventional x-ray activated luminescent screen 32 of the type conventionally used with x-ray film to illuminate the x-ray image produced. A uniform layer of compressible material 34 is also attached to the upper surface of the support plate 18 with a second luminescent screen 36 attached to the material 34.

The concave-convex window member 24 is preferably formed from a material which retains its resiliency over a long period of time and which is substantially more x-ray transparent than heretofore used materials thereby allowing the production of an x-ray film with substantially less patient x-ray exposure. A material having such properties which has been found to be particularly suitable for use in accordance with the present invention is comprised of powdered carbon and a fibrous material held in a matrix of cured plastic material.

Particularly suitable fibrous materials for forming the window member 34 are carbon filaments and synthetic organic fibers. Of the organic fibers which can be used, a product of I. E. duPont de Nemours and Company, which is comprised of fibers having an average diameter of about 0.0005 inch, marketed under the trademark "KEVLAR" is preferred. Carbon filaments having an average diameter of 0.007 inch are preferred, e.g., the carbon filament product commercially available from the Carbon Products Division of Union Carbide Corporation under the trade name "THORNEL," and both the carbon filaments and organic fibers are formed into tows of about 6000 filaments or mats of woven or randomly oriented filaments.

The tows of fibrous material are impregnated with a curable plastic material, such as by passing the tows through a liquid body of the material, and are laid up in a side-by-side relationship to form a layer or "tape" of desired width. The impregnated tape is then cut into sections which are stacked one on top of the other in a curing fixture in a manner whereby the tows forming adjacent layers are positioned transversely to each other, preferably perpendicularly to each other followed by the curing of the plastic material utilized. When mats of fibrous material are included in the composite material, they are also impregnated with the curable plastic material and are positioned between two or more sections of impregnated tape.

A variety of thermoplastic or thermosetting materials can be utilized including, but not limited to, resins such as polyester, epoxy, phenolic, ploypropylene, polystyrene, nylon, polycarbonate, polyurethane and polyphenolene oxides. Thermosetting resins are most suitable for use in forming the window member of the present invention. Thermosetting phenolic resins are preferred with phenolformaldehyde resins such as bisphenol A-novalak being the most preferred. The x-ray transparent fibrous materials mentioned above, i.e., carbon filaments and synthetic organic fibers are substantially x-ray transparent, but all of the various thermoplastic and thermosetting materials mentioned above are relatively opaque to x-rays. In order to minimize the quantity of thermoplastic or thermosetting material present in the window member 24, powdered carbon is preferably mixed with the thermoplastic or thermosetting material utilized in the amount of about 20 percent by volume of the mixture. The stacked sections of tape or mat are preferably impregnated with the mixture of thermoplastic or thermosetting material and powdered carbon in an amount of about 40 percent by weight of the fibrous material and mixture, so that when the stacked sections are squeezed or compressed under pressure, excess amounts of the mixture are removed from the sections and the powdered carbon is distributed throughout the resultant composite material. The powdered carbon fills voids between the tape sections and between the tows forming the sections displacing the thermoplastic or thermosetting material therefrom and providing a carbon-fiber uniformity to the finished composite material, all of which substantially improves the x-ray transparency of the composite material as compared to the materials utilized heretofore. As will be understood, the transversely stacked tows of fibrous material present in the composite material gives the material extremely high tensile strength even when formed in very thin sheets.

The particular number of transversely stacked sections or layers of the impregnated tape utilized to form the window member 24 determines the thickness, flexibility and strength of the member as well as whether the member is flat or curved. When an even number of transversely laid-up sections or layers of the tape are utilized, the member is unbalanced, i.e., the tows of the top and bottom layers are positioned transversely to each other, and upon being removed from the curing fixture, the member takes on a curved shape, i.e., a shape corresponding to the arc of a circle. When an odd number of layers are utilized, the resulting member is balanced, i.e., the tows of the top and bottom layers are parallel, and will remain flat when removed from the curing fixture. A curved unbalanced panel of the composite material is utilized for the window member 24. When the curved panel is placed in the frame 12 of the cassette 10 it takes on the concave-convex shape described above and illustrated in the drawings. For example, a four layer panel formed of powdered carbon, carbon filaments and bisphenol A-novalak resin cured at a temperature of about 300° F. while maintaining a pressure thereon of about 1000 psig for a period of about 60 minutes is curved and has a thickness of about 0.020 inch.

The window member 24 can include one or more mats or carbon filaments or organic fibers positioned between tapes of either fibrous material or the member can be formed entirely of stacked mats. The use of mats in forming the surface is economically advantageous since the fibrous materials in mat form are less expensive to produce than in tape form.

In operation of the cassette 10, the film support plate 18 is opened as shown in FIG. 3, and a section of conventional x-ray film 38 is placed on top of the screen 36 and compressible material 34 attached to the plate 18. The plate 18 is then moved to the closed position and locked in place as shown in FIG. 2. As the plate 18 is moved to the locked position, the film 38 contacts the screen 32 and compressible material 30 attached to the window member 24 and forces the window member 24 upwardly whereby it is deformed into a substantially flat configuration. As the window member 24 is deformed into the flat configuration, the peripheral edges thereof are moved inwardly within the frame 12. The deformation of the window member 24 exerts pressure against the film support plate which results in the x-ray film being clamped under pressure over its entire surface area between the window member 24 and support plate 18 thereby insuring that air is not trapped between the film 38 and the screens 32 and 36.

Thus, by the present invention, an improved x-ray film cassette is provided which prevents air from being trapped between the x-ray film and luminescent screens utilized, and in addition, reduces patient x-ray exposure due to the substantially increased x-ray transparency of the material from which the x-ray window 24 is formed. While presently preferred embodiments of the invention have been described for purposes of this disclosure, numerous changes in the construction and arrangement of parts can be made, which changes are encompassed within the spirit of this invention as defined by the appended claims.

What is claimed is:

1. An improved x-ray film cassette which comprises;
 a frame having sides and an open top and bottom;
 a resilient concave-convex window member attached to and closing the open top of said frame, the convex side of said member facing the bottom of said frame, said window member being a composite material comprised of powdered carbon and a fibrous material selected from the group consisting of synthetic organic fibers, carbon filaments and both synthetic organic fibers and carbon filaments held in a matrix of cured plastic material;

a film support plate closing the bottom of said frame and hingedly attached thereto so that said support plate can be selectively opened and closed, said support plate being spaced from said window member whereby when said support plate is in the closed position with x-ray film supported thereon, said window member is deformed into a substantially flat shape and said x-ray film is clamped under pressure over its entire surface area between said window member and said support plate; and means for locking said support plate in the closed position attached to said frame.

2. The apparatus of claim 1 wherein said fibrous material is carbon filaments and said plastic material is a thermosetting resin.

3. The apparatus of claim 2 wherein said carbon filaments have an average diameter of 0.0007 inch and said thermosetting resin is a phenolic resin.

4. The apparatus of claim 3 wherein said phenolic resin is bisphenol A-novalak.

5. An improved x-ray film cassette which comprises:
a rectangular frame having sides and an open top and bottom;
a highly x-ray transparent window member formed of a composite material comprised of powdered carbon and a fibrous material selected from the group consisting of synthetic organic fibers, carbon filaments and both synthetic organic fibers and carbon filaments held in a matrix of cured plastic material attached to and closing the open top of said frame;
a film support plate closing the bottom of said frame and hingedly attached thereto so that said support plate can be selectively opened or closed; and
means for locking said support plate in the closed position attached to said frame.

6. The apparatus of claim 5 which is further characterized to include a uniform layer of felt and an x-ray activated luminescent screen attached to each of the inwardly facing surfaces of said window member and said film support plate.

7. The apparatus of claim 6 wherein said window member in concave-convex in shape with the convex side thereof facing said film support member.

8. The apparatus of claim 7 wherein said fibrous material is carbon filaments and said plastic material is a thermosetting resin.

9. The apparatus of claim 8 wherein said carbon filaments have an average diameter of 0.0007 inch and said thermosetting resin is a phenolic resin.

10. The apparatus of claim 9 wherein said phenolic resin is bisphenol A-novalak.

* * * * *